US009635457B2

(12) United States Patent
Nowak

(10) Patent No.: US 9,635,457 B2
(45) Date of Patent: Apr. 25, 2017

(54) AUDIO PROCESSING UNIT AND METHOD OF PROCESSING AN AUDIO SIGNAL

(71) Applicant: Sennheiser electronic GmbH & Co. KG, Wedemark (DE)

(72) Inventor: Alexander Nowak, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 14/668,143

(22) Filed: Mar. 25, 2015

(65) Prior Publication Data

US 2015/0358731 A1 Dec. 10, 2015

(30) Foreign Application Priority Data

Mar. 26, 2014 (DE) ........................ 10 2014 205 681

(51) Int. Cl.
*H04B 1/00* (2006.01)
*H04R 3/00* (2006.01)

(52) U.S. Cl.
CPC .................................... *H04R 3/005* (2013.01)

(58) Field of Classification Search
CPC ...................................................... H04R 3/005
See application file for complete search history.

(56) References Cited

U.S. PATENT DOCUMENTS

| | | | | |
|---|---|---|---|---|
| 6,084,973 | A | 7/2000 | Green et al. | |
| 6,317,501 | B1 | 11/2001 | Matsuo | |
| 2003/0105540 | A1 * | 6/2003 | Debail | H04M 9/082 381/66 |
| 2011/0085686 | A1 * | 4/2011 | Bhandari | H04R 3/005 381/313 |
| 2014/0079259 | A1 | 3/2014 | Kwon | |

FOREIGN PATENT DOCUMENTS

| | | |
|---|---|---|
| DE | 20 2009 016 065 | 5/2011 |
| EP | 1414268 | 4/2004 |
| EP | 1538867 | 6/2005 |
| EP | 1865510 | 12/2007 |

* cited by examiner

*Primary Examiner* — Regina N Holder
(74) *Attorney, Agent, or Firm* — Haug Partners LLP

(57) ABSTRACT

An audio processing unit having a first and second input for receiving output signals of a microphone with a first and a second physically symmetrically structured microphone capsule. The audio processing unit further has a first filter unit and a first delay unit which is coupled to the first input, and a second filter unit and a second delay unit which is coupled to the second input. The audio processing unit further has an adding unit for adding signals from the first and second filter units and a control unit for influencing the filter parameters of the first and second filters and/or the delay times of the first and second delay units depending on an amplitude of an audio signal received via the first and/or second input. A directivity factor of the output signal of the microphone is controlled depending on the amplitude of the output signal of the microphone.

7 Claims, 5 Drawing Sheets

AUDIO PROCESSING UNIT AND METHOD OF PROCESSING AN AUDIO SIGNAL

The present application claims priority to German Patent Application No. DE 10 2014 205 681.0 filed on Mar. 26, 2014, the disclosure of which is incorporated herein by reference in its entirety.

FIELD OF THE INVENTION

The present invention concerns an audio processing unit, in particular a mixing desk, and a method of processing an audio signal.

It is noted that citation or identification of any document in this application is not an admission that such document is available as prior art to the present invention.

DE 20 2009 016 065 U1 discloses an audio processing unit having a first input for receiving an output signal of a first microphone capsule and a second input for receiving an audio signal of a second microphone capsule. The output signals of the first and second microphone capsules are subjected to audio signal processing and then added. The directional characteristic (figure-of-eight, cardioid, super-cardioid and omnidirectional) of the microphone are adjusted by influencing the output signals of the first and second microphone capsules.

The German Patent and Trade Mark Office searched the following documents in the application from which priority is claimed: US 2011/0069846 A1; EP 1414268 A2; US 2011/0085 686 A1; U.S. Pat. No. 6,317,501 B1; DE 20 2009 016 065 U1; US 2014/0 079 259 A4; U.S. Pat. No. 6,084,973 A; EP 1538867 A1 and EP 1865510 A2.

It is noted that in this disclosure and particularly in the claims and/or paragraphs, terms such as “comprises”, “comprised”, “comprising” and the like can have the meaning attributed to it in U.S. Patent law; e.g., they can mean “includes”, “included”, “including”, and the like; and that terms such as “consisting essentially of” and “consists essentially of” have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

An object of the present invention is to provide an audio processing unit with which the directional characteristic of a microphone can be adjusted or influenced in an improved fashion.

Thus there is provided an audio processing unit, in particular a mixing desk, having a first and a second input for receiving output signals of a microphone with a first and a second physically symmetrically structured microphone capsule. The audio processing unit further has a first filter unit and a first delay unit which is coupled to the first input, and a second filter unit and a second delay unit which is coupled to the second input. The audio processing unit further has an adding unit for adding the signals from the first and second filter units and a control unit for influencing the filter parameters of the first and second filters and/or the delay times of the first and second delay units in dependence on an amplitude of an audio signal received by way of the first and/or second input.

The control unit is adapted to control a directivity factor of the signals of the microphone, that are received or detected by way of the first and/or second input, in dependence on the amplitude of the detected audio signal.

In a further aspect of the present invention the control unit is adapted in dependence on the detected amplitude of the audio signals of the microphone, that are detected at the first and second inputs, to switch between a cardioid, figure-of-eight, supercardioid, omnidirectional and wide cardioid directional characteristic.

In a further aspect of the present invention the control unit is adapted to control the directional characteristic of the signals of the microphone, that are detected by way of the first and/or second input, in dependence on the frequency of the detected audio signal.

In a further aspect of the present invention there is provided an audio processing unit, in particular a mixing desk, which has a first and a second input for receiving output signals of a microphone having a first and a second physically symmetrically structured microphone capsule. The audio processing unit has a first amplification unit for amplifying an audio signal received by way of the second input and a phase switching unit for inverting the phase of the output signal of the amplification unit in dependence on a control signal. The audio processing unit further has a voltage-controlled directing unit for adjusting a directivity factor of the output signals of the microphone in dependence on an amplitude of an output signal of the microphone.

The invention also concerns a method of processing an audio signal. Output signals of a microphone having a first and a second physically symmetrically structured microphone capsule are received by way of a first and a second input. Filtering of the received output signal is effected by means of a first filter unit and a first delay of an output signal at the first input is effected by means of a first delay unit. Filtering of an output signal at a second input is effected by means of a second filter unit and a second delay of the output signal at the second input is effected by means of a second delay unit. The signals from the first and second filter units are added in an adding unit. The filter parameters of the first and second filter and/or the delay times of the first and second delay units are controlled or influenced in dependence on an amplitude of an audio signal received by way of the first and/or second input, by a control unit. A directivity factor of the output signal of the microphone is controlled in dependence on the amplitude of the output signal.

The invention concerns the notion of feeding the output signals of two microphone capsules which are disposed in one microphone to a different audio processing operation to be able to adjust the directional characteristic of the microphone. In particular in that case the amplitude of the output signals of the first and/or second microphone capsule is detected and audio signal processing of the output signals of the microphone capsules is controlled in dependence on the amplitude (that is to say the amplitude functions as a control signal) to influence the directional characteristic.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

According to the invention there is provided a microphone having at least two physically symmetrically structured microphone capsules.

Figure 1:
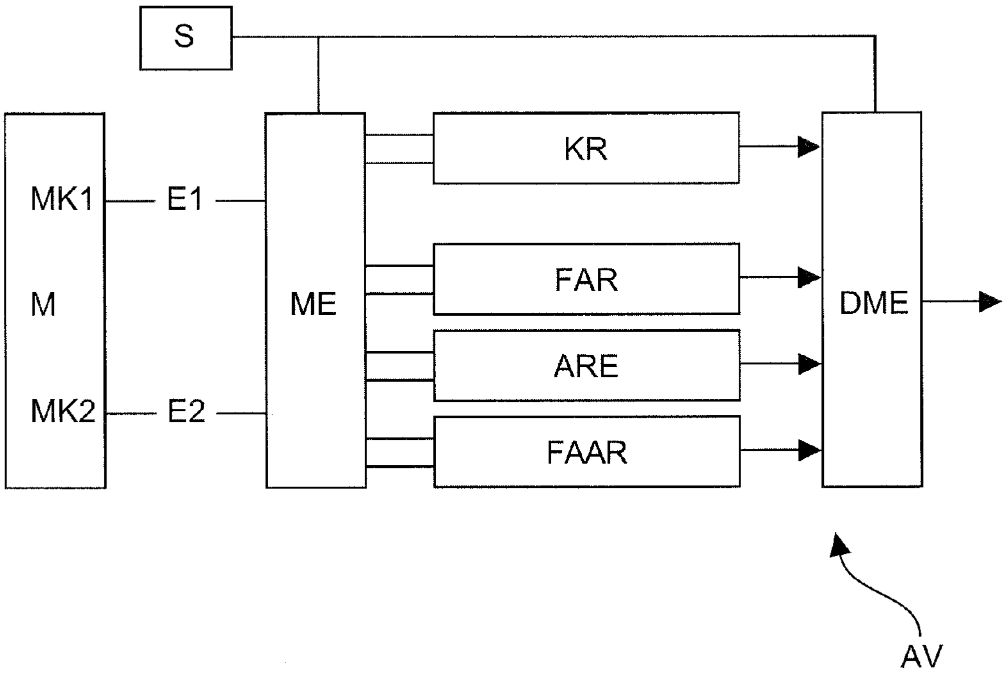
FIG. 1 shows a block circuit diagram of an audio processing unit according to a first embodiment.

FIG. 1 shows a block circuit diagram of an audio processing unit according to a first embodiment. The audio processing unit AV has a first and a second input E1, E2 at which the output signals of a first and a second microphone capsule MK1, MK2 of a microphone M are output. Input signals E1, E2 are fed to a mixing unit ME. The audio processing unit AV further has a constant directional characteristic unit KR, a frequency-dependent directional characteristic unit FAR, an amplitude-dependent directional characteristic unit ARE and a frequency- and amplitude-dependent directional characteristic unit FAAR. The output signals of those four units are fed to a demixing unit DME. The audio processing unit AV further has a selector S which selects one or more of the four directional characteristic units KR, FAR, ARE, FAAR so that the output signals of the first and second microphone capsules MK1, MK2 are subjected to a corresponding audio signal processing operation in one of the directional characteristic units.

In that respect processing in the frequency- and amplitude-dependent directional characteristic unit FAAR corresponds to the signal processing according to the invention.

According to the invention the microphone has a first and a second microphone capsule MK1, MK2.

According to the invention the directional characteristic of the beam angle or the directivity factor of the output signals of the microphone are adjusted by the audio signal processing unit AV in dependence on the amplitude of the output signals of the microphone M. If therefore the distance of a microphone M relative to a singer or speaker is altered then the audio processing unit according to the invention can adjust the directional characteristic for example in such a way that the directional characteristic becomes narrower, that is to say the region which can be detected by the microphone is narrowed. First-order directional effects are possible when using two microphone capsules.

According to the invention the beam angle or the directivity factor of the output signal can be adjusted by means of the audio processing unit (AV) in dependence on the amplitude of the output signal of the microphone M. The various directional characteristics (omnidirectional, cardioid, wide cardioid, supercardioid, figure-of-eight) can be achieved by audio processing of the output signals of the first and second microphone capsules MK1, MK2 of the microphone M. It is thus possible to switch over between an omnidirectional, cardioid, supercardioid, wide cardioid and figure-of-eight by changing over or switching over a directional characteristic to another directional characteristic of the microphone. As each of the directional characteristics (omnidirectional, cardioid, supercardioid, wide cardioid and figure-of-eight) as well as combinations thereof has a specific beam angle or directivity factor the beam angle or the directivity factor is also adjusted by switching over of the directional characteristic in dependence on the output signals of the microphone M. The beam angle of a directional characteristic of a microphone is also referred to as the directivity factor. A directivity factor is a pure numerical ratio specifying by how much the directivity factor is less than that of an ideal omnidirectional.

An omnidirectional characteristic is an omnidirectional directional characteristic. A figure-of-eight directional characteristic represents a directional characteristic with a dipole, wherein there are opposite polarities at front and rear. A cardioid directional characteristic is a mixture of an omnidirectional and a figure-of-eight directional characteristic. Each directional characteristic has a specific beam angle or directivity factor.

According to the invention the audio signals detected by the first and second microphone capsules MK1, MK2 and audio processing for example by an audio processing unit AV can be effected at a later time.

Figure 2:
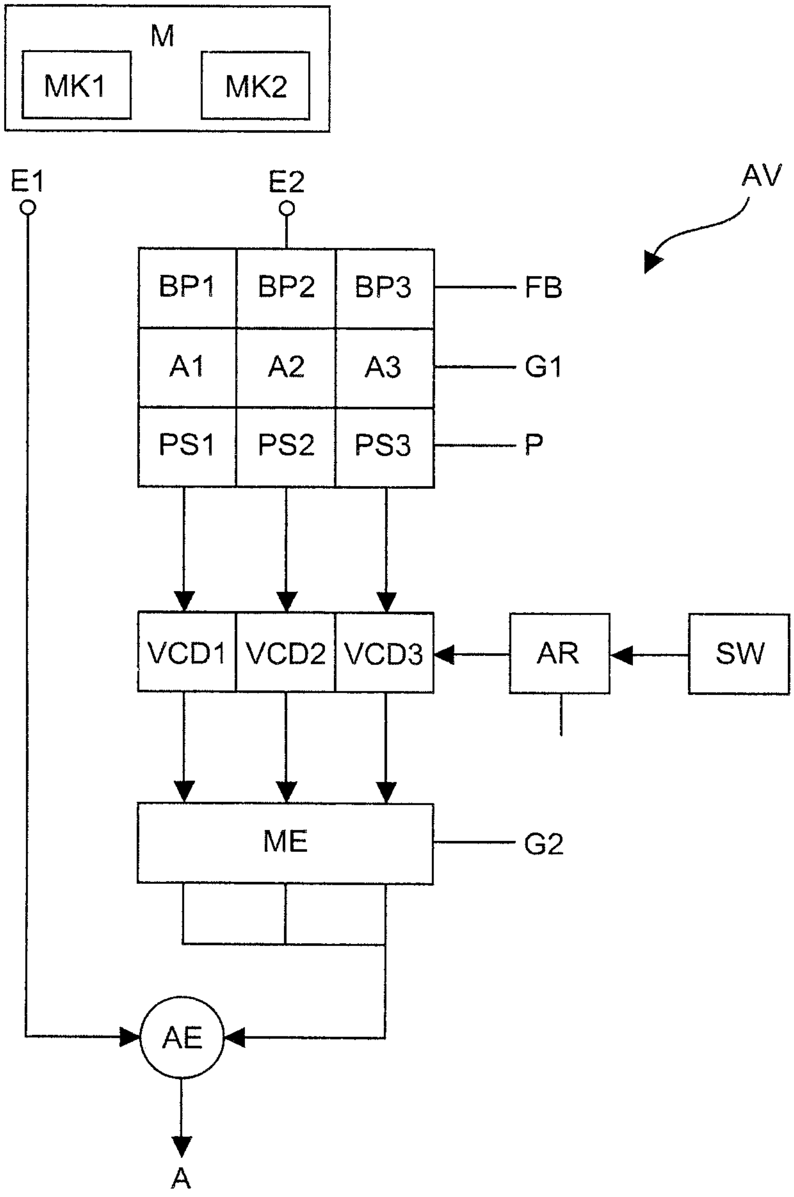
FIG. 2 shows a block circuit diagram of an audio processing unit according to a second embodiment.

FIG. 2 shows a block circuit diagram of an audio processing unit according to a second embodiment. The audio processing unit has two inputs E1, E2, to which the first and second microphone capsules MK1, MK2 of a microphone M can be connected. In accordance with the second embodiment the output signal E1 of the first microphone capsule MK1 is fed substantially without further audio processing to an adding unit AE. The first microphone capsule MK1 or the output signal of the first microphone capsule MK1 represents the front signal in accordance with the second embodiment. In accordance with the second embodiment processing of the output signal of the second microphone capsule MK2 (rear signal) can be effected for example in a tri-band processing operation. Firstly band pass filtering is effected in the band pass filter BP1, BP2, BP3. Amplification (gain) G1 can then be adjusted in an amplification unit A1, A2, A3 for the three bands. The phase P can further be adjusted in a phase switching unit PS1, PS2, PS3. In that case the phase can be either normal or inverted.

The output signals of the phase switching units PS1-PS3 can be fed to a voltage-controlled directing unit VCD1-VCD3. The signal of the first microphone capsule can serve as a control signal for the directing units. The audio processing unit AV can also have an attack release unit AR. The audio processing unit AV can also have a threshold value unit SW. The output signals of the voltage-controlled directing unit VCD1-VCD3 can be fed to a mixing unit ME. The signals of the mixing unit ME can be suitably amplified in a second amplification means G2 and can then be added in the adding unit AE to the output signals of the first microphone capsule MK1.

A frequency and/or amplitude-dependent directional characteristic or a directivity factor of the output signals of the microphone can be adjusted with the audio processing unit AV according to the second embodiment.

According to the second embodiment the audio processing unit can be placed for example in a mixing desk or the audio processing unit can be implemented in the form of a software solution (as a 'virtual mixing desk'). The microphone M of the second embodiment corresponds to the microphone of the first embodiment and has at least two output signals corresponding to the output signals of the microphone capsules MK1, MK2.

Figure 3:
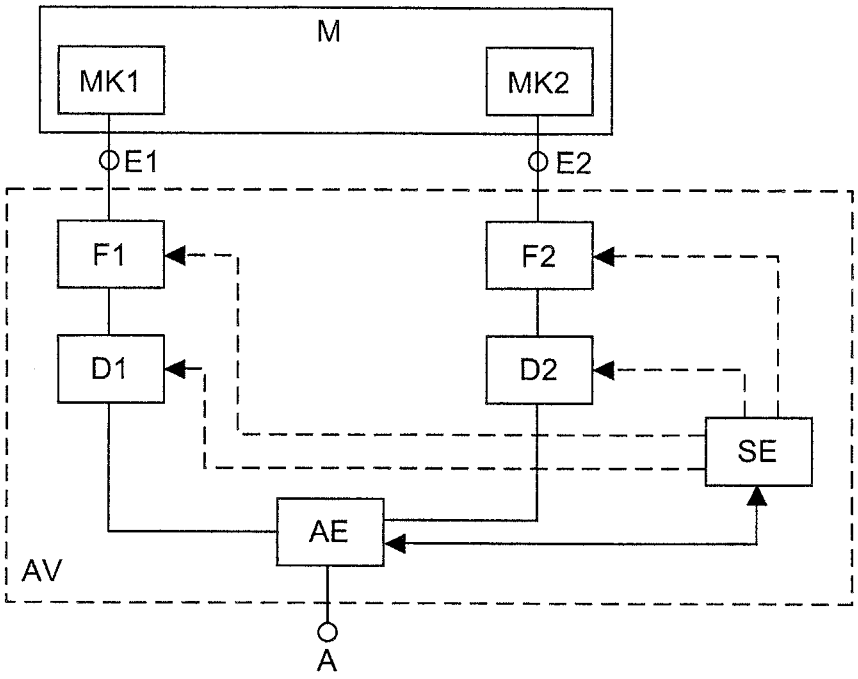
FIG. 3 shows a block circuit diagram of an audio processing unit according to a third embodiment.

FIG. 3 shows a block circuit diagram of an audio processing unit according to a third embodiment. FIG. 3 shows a microphone with a first and a second microphone capsule MK1, MK2 and an audio processing unit AV.

The microphone of the third embodiment has for example a double capsule MK1, MK2 with two (symmetrical) push-pull transducers optionally operating in acoustic combination. The microphone M can be for example laterally addressed. A cardioid directional characteristic of the microphone can be oriented towards the front or the rear. An omnidirectional characteristic is also possible. The microphone M has two outputs for the output signals of the first and second microphone capsules MK1, MK2. The directional characteristic or the directivity factor of the microphone M is adjustable insofar as the output signals of the first and second microphone capsules MK1, MK2 can be differently mixed together.

For example an omnidirectional characteristic can be achieved if the output signals of the first and second microphone capsules MK1, MK2 have the same gain. A wide cardioid directional characteristic can be achieved for example if the gain of the rear channel is lower than the gain of the front channel. A cardioid directional characteristic can be achieved if only the front channel or that microphone capsule which corresponds to the front channel is activated. A figure-of-eight directional characteristic can be achieved if the output signals of the microphone capsules MK1, MK2 are equally amplified but the phase of the rear channel is inverted. A supercardioid directional characteristic can be achieved if the gain of the rear channel is lower than the gain of the front channel and the phase of the rear channel is inverted. Stepless adjustment is also possible. In that respect the wide cardioid represents a directional characteristic between omnidirectional and cardioid and the supercardioid represents a directional characteristic between cardioid and figure-of-eight.

The audio processing unit AV has a first and a second input E1, E2 and a respective signal path connected to the first or second input. The first signal path has a first filter unit F1 and a first delay unit D1 and the second signal path has a second filter unit F2 and a second delay unit D2. The first and second filter units F1, F2 each have adjustable filter parameters. The delay of the first and second delay units D1, D2 can be adapted to be adjustable. The output signals of the delay units D1, D2 are added in an adding unit AE. The audio processing unit AV also has a control unit SE coupled to the adding unit AE. The control unit SE detects for example the amplitude of the output signals of the first and second microphone capsules MK1, MK2 and influences the filter parameters of the first and/or second filter units F1, F2 and/or the delay of the first and second delay units D1, D2 in dependence on the amplitude of the output signals of the first and/or second microphone capsules MK1, MK2. Thus the audio processing unit AV permits amplitude-dependent control or influencing of the directional characteristic of the microphone M.

The control unit SE can also acquire the information in respect of the amplitude of the output signals of the microphone M at another location than the adding unit AE.

According to the invention the control unit SE can detect the amplitude of the output signals of the microphone M continuously or at regular intervals and suitably adapt the filter parameters of the first and second filters F1, F2. That can be effected in analog or digital fashion. In that way the audio processing unit AV can appropriately react to changes in the amplitude of the output signals of the microphone M and correspondingly adjust the directional action or the directivity factor of the microphone M.

Optionally the control unit SE can be coupled directly to the first and/or second input E1, E2 in order to directly detect the amplitudes of the output signals of the microphone M and correspondingly adjust the directional characteristic or directivity factor.

According to the third embodiment an amplitude-dependent directional action or directivity factor can be made possible.

According to an aspect of the present invention the audio processing unit AV can have two filter units F1, F2 for filtering the output signals of the microphone to be able to correspondingly ascertain the amplitude of the output signals.

Figure 4:
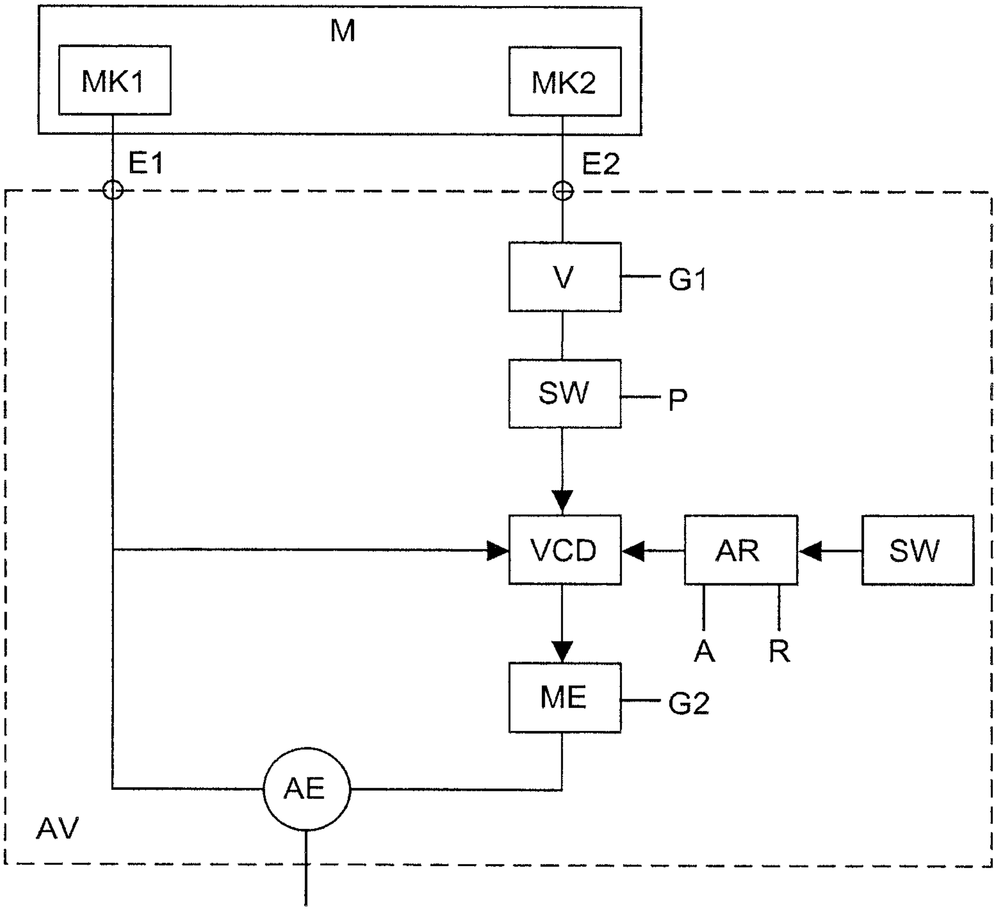
FIG. 4 shows a block circuit diagram of an audio processing unit according to a fourth embodiment.

FIG. 4 shows a block circuit diagram of an audio processing unit according to a fourth embodiment. The audio processing unit of the fourth embodiment can be connected to a microphone M having a first and a second microphone capsule MK1, MK2. Those two microphone capsules MK1, MK2 can be in the form of two physically symmetrically structured microphone capsules. The output signal of the first microphone capsule MK1 is fed to an adding unit AE. The output signal of the second microphone capsule MK2 is amplified in an amplification unit V in accordance with a set amplification (gain G1). The amplified output signal is subjected in a phase switching unit SW to phase switching, that is to say from plus to minus or vice-versa (normal or inverted). The audio signal processing unit AV also has a voltage-controlled directing unit VCD. That unit VCD receives as input signals the output signal of the first microphone capsule MK1, the output signal of the phase switching unit and an output signal of an attack release unit AR. The attack release unit AR can be coupled to a unit SW in which a limit value or a threshold value is set for regulation and a compression ratio can be determined. The output signal of the unit VCD can be amplified in a mixing unit ME in accordance with a second gain factor G2.

Figure 5A:
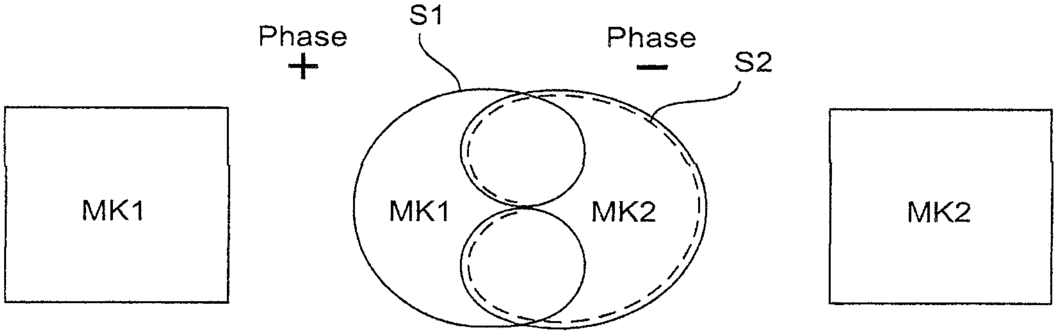
FIGS. 5A and 5B each show a diagrammatic view to illustrate the operation of the audio signal processing unit according to the invention.
Figure 5B:
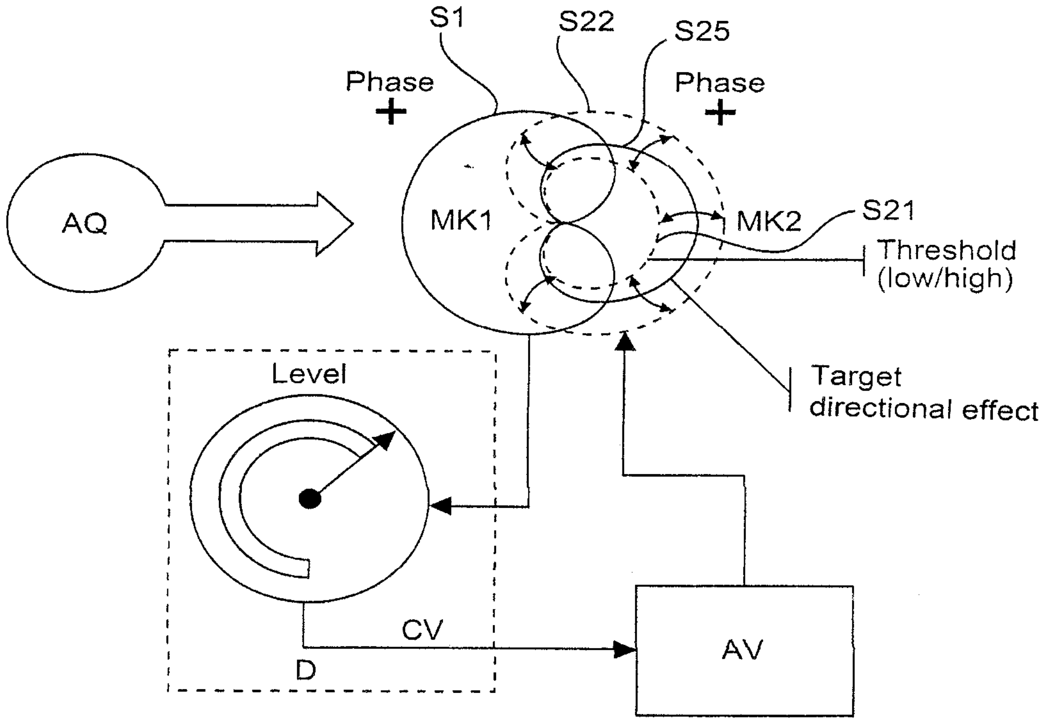

FIGS. 5A and 5B respectively show a diagrammatic view to illustrate a function of an audio signal processing unit according to a fifth embodiment. The audio signal processing unit according to the fifth embodiment can be based on an audio signal processing unit in accordance with the first, second or third embodiment.

FIG. 5A shows the output signal S1 of the first microphone capsule MK1 and the output signal S2 of the second microphone capsule MK2.

In accordance with the fifth embodiment there is provided a microphone M having two microphone capsules MK1, MK2. Those two microphone capsules can be in the form of physically symmetrically structured microphone capsules. In this respect the first microphone capsule MK1 can function as the front microphone capsule and the second microphone capsule MK2 can function as the rear microphone capsule. FIG. 5A shows in particular that the phase of the output signal of the first capsule MK1 is positive and the phase of the output signal of the second capsule MK2 is negative.

The microphone according to the fifth embodiment and its two microphone capsules MK1, MK2 make it possible to produce a directional action from an omnidirectional to a figure-of-eight and all hybrid forms like for example cardioid, supercardioid etc and thus the corresponding directivity factors. That can be achieved for example by the signal of the second capsule MK2, that is to say the signal of the rear capsule, being controlled or subjected to audio processing. In accordance with the invention the amplitude of the first microphone capsule MK1 (the front microphone capsule) can be detected and used as a control signal for audio processing of the second output signal. In that case the output signal of the second microphone capsule MK2 (rear microphone capsule) can be controlled in dependence on the detected amplitude of the output signal of the first microphone capsule MK1, as has been described hereinbefore for example in respect of the fourth embodiment. Thus the output signal both of the first microphone capsule MK1 and also the output signal of the second microphone capsule MK2 are detected. The two output signals can be processed immediately or also processed subsequently or at a later time. A limit value or threshold value T can be set or adjusted in the limit value unit SW for adjusting the processing of the output signals of the two microphone capsules MK1, MK2. If that limit value is exceeded then the phase and/or the volume of the signal of the second microphone capsule MK2 is correspondingly influenced.

FIG. 5B shows the output signal S1 of the first microphone capsule MK1 and a target output signal S2S of the second microphone capsule MK2. Examples of the output signal S21, S22 of the second capsule MK2 are also shown. In the case of the output signal S21 the threshold value is low and in the case of the second output signal S22 the threshold value is high. The phases of the two output signals are respectively positive, that is to say not inverted. In accordance with the fifth embodiment various possible directional effects can be set, namely directional effects between an omnidirectional characteristic (equal volume or sensitivity of the front capsule) and cardioid (rear capsule has no signal). The target output signal S2S can range between the first and second output signals S21, S22, that is to say between omnidirectional and cardioid.

According to the invention the above-described audio signal processing is performed in a bass range, that is to say that audio signal processing is performed only for given frequencies. In accordance with the invention it is possible to dynamically compensate for proximity effects. Optionally it is also possible to provide a detector D which detects the level of the output signal of the first microphone capsule MK1 and produces therefrom a control voltage CV which is fed to the audio processing unit.

According to the invention the audio processing unit can also be used for subsequently processing stored audio signals of the microphone.

According to the invention the audio processing unit can be integrated in a microphone or can be in the form of a unit which is external to the microphone so that processing of the output signals of the microphone can also be effected later.

The microphone according to the invention optionally has a first and a second physically symmetrically structured microphone capsule.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An audio processing unit comprising:

a first input configured to receive an output audio signal of a microphone via a first microphone capsule;

a second input configured to receive an output audio signal of the microphone via a second microphone capsule, wherein the first and second microphone capsules are physically symmetrically structured microphone capsules within said microphone;

a first filter unit and a first delay unit which are coupled to the first input and, together, filter and delay the output signal of the first microphone capsule;

a second filter unit and a second delay unit which are coupled to the second input and, together, filter and delay the output signal of the second microphone capsule;

an adding unit configured to add the filtered and delayed signals from the first filter unit and first delay unit, and the second filter unit and delay unit, and to provide an output signal; and a control unit configured to:

control a directivity factor of the output signal provided by the adding unit by influencing filter parameters of the first and second filters, delay times of the first and second delay units, or both in dependence on at least one of an amplitude of an audio signal received by way of the first input and an amplitude of an audio signal received by way of the second input.

2. The audio processing unit as set forth in claim 1;

wherein the control unit is adapted to switch between a cardioid, figure-of-eight, supercardioid, omnidirectional, and wide cardioid directional characteristic in dependence on amplitudes of audio signals received by the first and second inputs.

3. The audio processing unit as set forth in claim 1;

wherein the control unit is adapted to control the directivity factor additionally in dependence on a frequency of the received audio signal.

4. The audio processing unit according to claim 1;

wherein the control unit is configured to control the directivity factor of the output signal provided by the adding unit by influencing filter parameters of the first and second filters, delay times of the first and second delay units, or both in further dependence of a frequency of at least one of the audio signal received by way of the first input and the audio signal received by way of the second input; and wherein the influence of said amplitude depends on said frequency.

5. An audio processing unit comprising:

a first input configured to receive an output audio signal of a microphone via a first microphone capsule;

a second input configured to receive an output audio signal of the microphone via a second microphone capsule, where the first and second microphone capsules are physically symmetrically structured microphone capsules;

a first amplification unit configured to amplify the output audio signal received by way of the second input;

a phase switching unit configured to invert a phase of an output signal of the first amplification unit in dependence on a control signal; and a voltage-controlled directing unit configured to adjust a directivity factor of an audio signal of the microphone in dependence on an amplitude of the audio signal.

6. A method of processing an audio signal comprising the steps:

receiving a first output audio signal of a microphone via a first microphone capsule by way of a first input;

receiving a second output audio signal of the microphone via a second microphone capsule by way of a second input, wherein the first and second microphone capsules are physically symmetrically structured microphone capsules within said microphone;

filtering the received first output audio signal by a first filter unit and delaying the received first output audio signal by means of a first delay unit;

filtering the received second output audio signal by means of a second filter unit and delaying the received second output audio signal by means of a second delay unit;

adding the filtered first and second signals by an adding unit and outputting an output signal from the adding unit;

controlling a directivity factor of the output signal as outputted by the adding unit by influencing parameters of the first and second filters, delay times of the first and second delay units, or both in dependence on an amplitude of at least one of the received first and second output audio signals by a control unit.

7. The method according to claim 6;

wherein the filter parameters of the first and second filters, delay times of the first and second delay units, or both are further influenced in dependence of a frequency of at least one of the audio signal received by way of the first input and the audio signal received by way of the second input; and wherein the influence of said amplitude depends on said frequency.

* * * * *